United States Patent [19]
Krauss

[11] Patent Number: 5,640,776
[45] Date of Patent: Jun. 24, 1997

[54] APPARATUS FOR CHECKING PRESSURE OF A VEHICLE PNEUMATIC TIRE

[76] Inventor: Leonard Krauss, 955 Terra California Dr., Unit 5, Walnut Creek, Calif. 94595-2518

[21] Appl. No.: 513,487

[22] Filed: Aug. 10, 1995

Related U.S. Application Data

[63] Continuation-in-part of Ser. No. 388,555, Feb. 14, 1995, abandoned.

[51] Int. Cl.⁶ .................................................. G01M 17/02
[52] U.S. Cl. .......................... 33/203; 33/203.15; 33/832; 33/600; 116/34 R; D10/86
[58] Field of Search .......................... 33/203, 203.15, 33/203.16, 203.17, 832, 833, 600; 116/34 R, 34 A; D10/86

[56] References Cited

U.S. PATENT DOCUMENTS

| | | | |
|---|---|---|---|
| D. 59,364 | 10/1921 | Low | D10/86 |
| 1,363,825 | 12/1920 | Taylor | 33/203 |
| 1,404,425 | 1/1922 | Bartholdy | |
| 2,435,644 | 2/1948 | Beckett et al. | |
| 2,508,849 | 11/1950 | Williams | |
| 2,712,808 | 7/1955 | Figgins | 116/34 A |
| 2,717,450 | 9/1955 | Pickering | |
| 2,997,976 | 8/1961 | Goss | 116/34 A |
| 3,580,064 | 5/1971 | Bar-on | |
| 3,667,561 | 6/1972 | Hutchinson et al. | 33/833 |
| 4,748,845 | 6/1988 | Rocco et al. | D10/86 |
| 4,768,460 | 9/1988 | Soon-Fu | 116/34 R |

FOREIGN PATENT DOCUMENTS 290929  10/1935  Italy .......................................... 33/832

Primary Examiner—Christopher W. Fulton
Attorney, Agent, or Firm—Thomas R. Lampe

[57] ABSTRACT

Apparatus for visually indicating when the pressure of a pneumatic tire falls below a desired level includes a support and two arms independently slidably movable along the support. The arms are selectively locked against movement relative to the support and the arms are retractable for storage purposes. The invention also encompasses a method of utilizing the apparatus to monitor the pressure of a pneumatic tire.

2 Claims, 3 Drawing Sheets

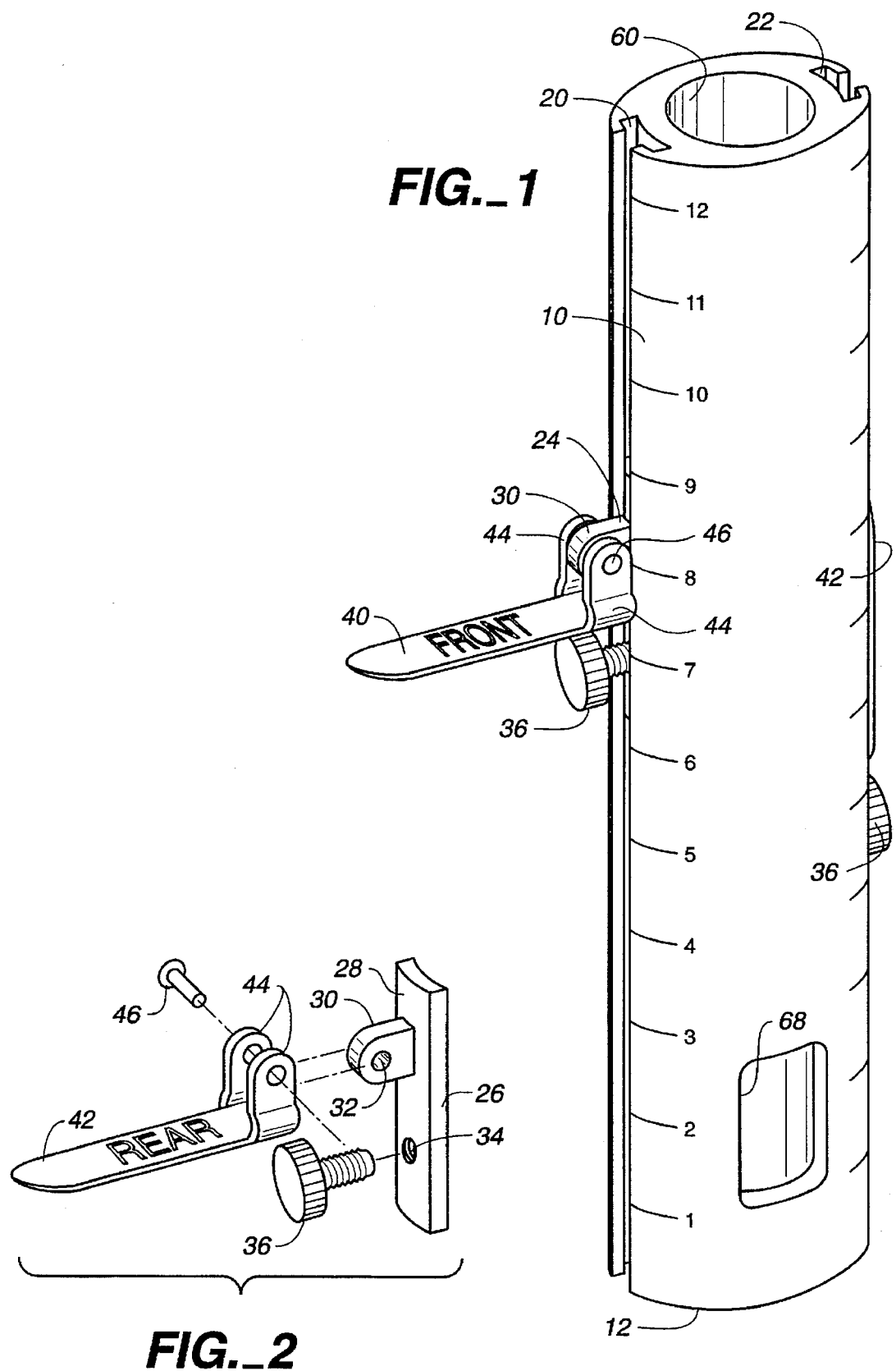
FIG._1
FIG._2

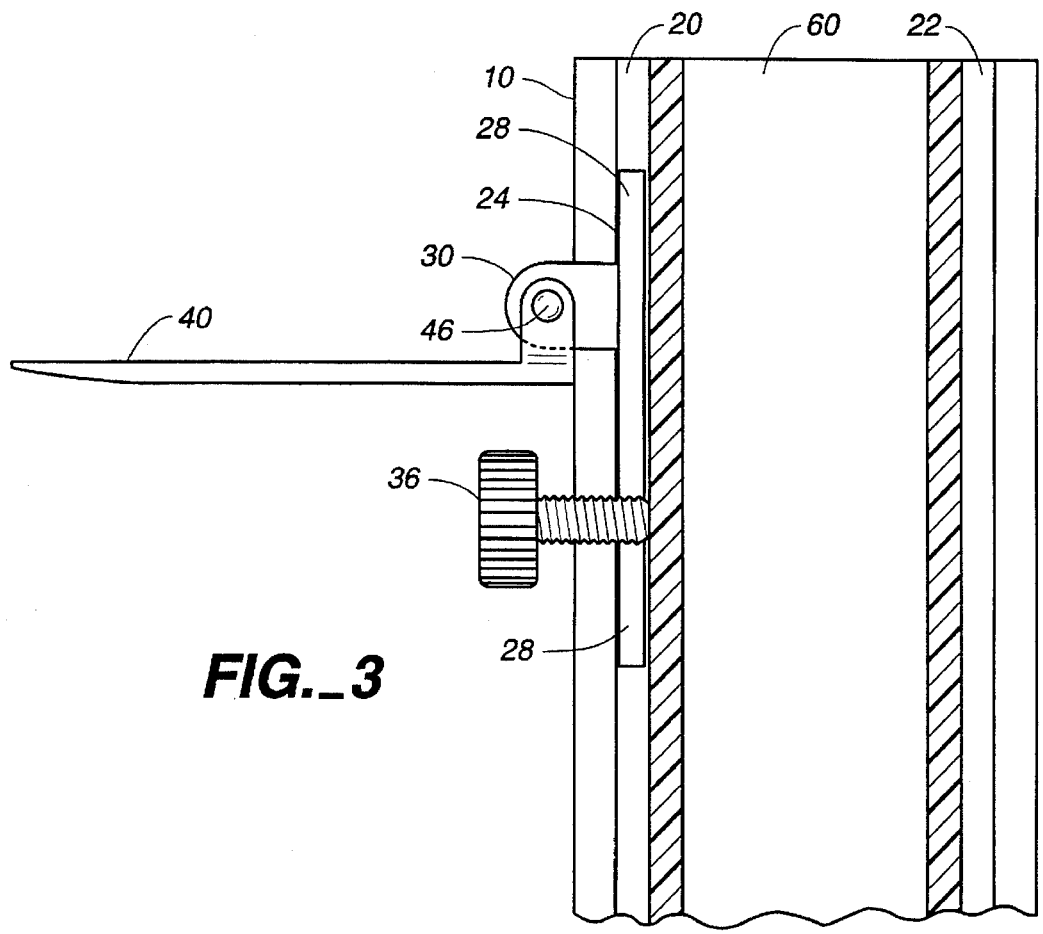
FIG._3
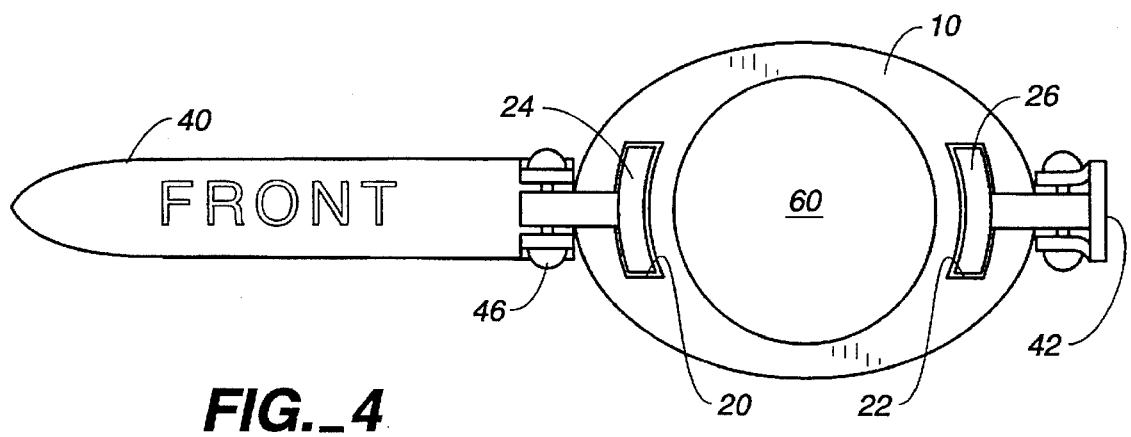
FIG._4

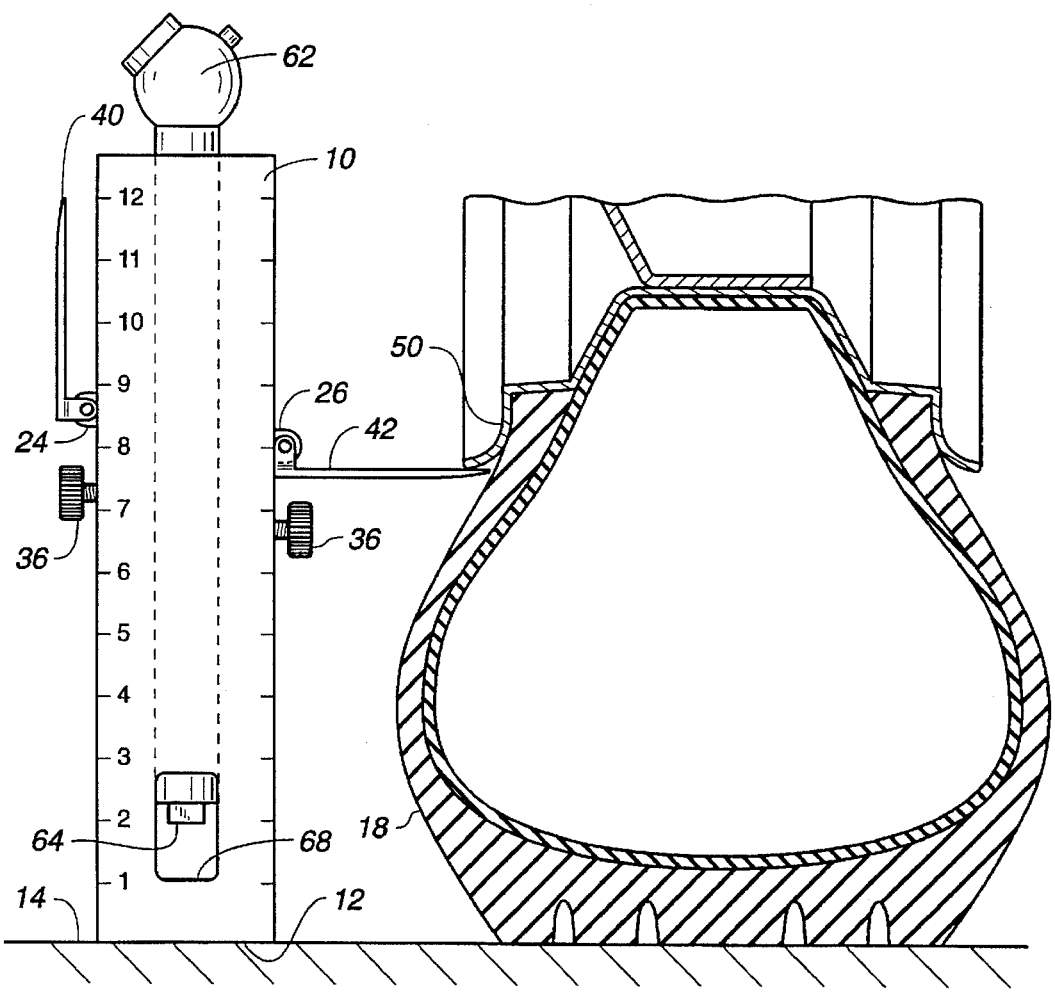
FIG._5
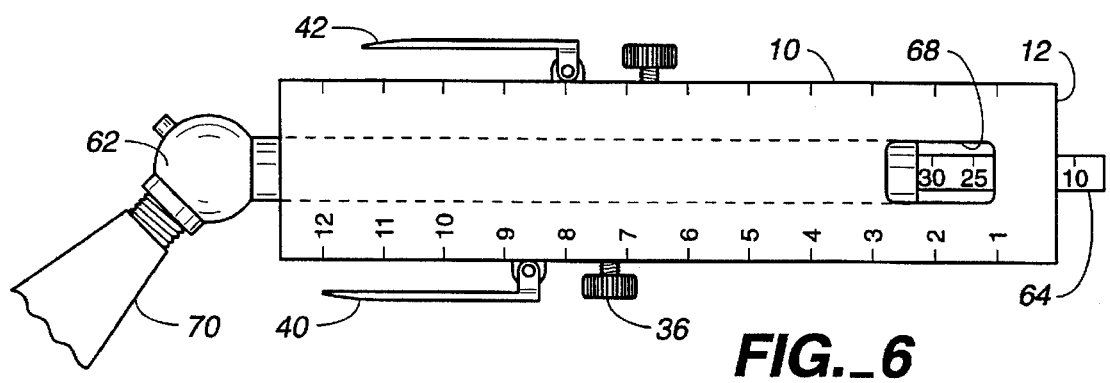
FIG._6

APPARATUS FOR CHECKING PRESSURE OF A VEHICLE PNEUMATIC TIRE

This is a continuation in part of U.S. patent application Ser. No. 08/388,555, filed Feb. 14, 1995, now abandoned.

TECHNICAL FIELD

The invention relates to an apparatus and method for checking pneumatic tire pressure while the pneumatic tire is on a vehicle. More particularly, the apparatus of the invention provides a visual indication when the pressure of the pneumatic tire falls below a desired level.

BACKGROUND ART

It is very important to maintain vehicle pneumatic tires at the proper pressure. Underinflated tires can be unsafe and result in waste of fuel. Although manufacturers of automobiles and tires recommend maintenance of specified air pressures, with frequent checking, such recommendations are seldom followed since, for the average motorist, checking tire pressure is a relatively dirty and inconvenient process.

When checking tire pressure a motorist typically must unscrew a tire valve cap, press a conventional air pressure gauge having an indicator against the tire valve end, remove the gauge, read the pressure indicated thereby, and then reattach the cap. This procedure must of course be carried out for all four tires of an automobile (more in the case of certain trucks and specialty vehicles). Motorist aggravation and frustration can be compounded by misadventure such as cap loss or damage.

It is known that some motorists employ miniature pressure gauges permanently installed on tire valve stems which will visually indicate loss of air pressure. Such arrangements are relatively expensive, affect wheel balance, and are not in widespread use.

Some military vehicles and a few trucks and specialty civilian vehicles employ complex and costly systems which enable a driver to monitor tire pressure from inside the vehicle, in some cases even when the vehicle is moving. Ordinary passenger cars do not offer such devices due to their relative complexity and high expense. Reliability is also a problem in connection with such systems.

The following patents are believed to be representative of the current state of the prior art in this field: U.S. Pat. No. 3,580,064, issued May 25, 1971, U.S. Pat. No. 2,508,849, issued May 23, 1950, U.S. Pat. No. 2,717,450, issued Sep. 13, 1955, U.S. Pat. No. 2,435,644, issued Feb. 10, 1948, U.S. Pat. No. 1,404,425, issued Jan. 24, 1922, U.S. Pat. No. 2,997,976, issued Aug. 29, 1961, U.S. Pat. No. 2,712,808, issued Jul. 12, 1955, U.S. Pat. No. 1,363,825, issued Dec. 28, 1920, U.S. Pat. No. Des. 59,364, issued Oct. 11, 1921, and Italian Patent No. 290,929, issued Dec. 3, 1931.

U.S. Pat. No. 2,435,644 (Beckett et al) is worthy of particular comment in that it shows a device for comparing the wheel height of a vehicle under load for the purpose of adjusting the internal air pressure of each tire to compensate for the actual load borne by each tire. Deflected and undeflected portions of each tire are measured and a tire's air pressure is to be increased when it is under a heavy load and decreased when the load on that tire is less. The Beckett et al device employs an elongated cross bar which is not movable to a retracted position and which must be relatively long since the Beckett et al system requires measurement of the distance between the top of the tire and the top of the wheel rim. Conversion scales are employed on the device which must be utilized to fulfill the objectives of the Beckett et al invention.

The Beckett et al device can retain only one measurement, and since the Beckett et al method requires eight measurements for a four-wheel vehicle, in connection with each trip the user must separately record each measurement, compare them to specified guidelines, adjust air pressures, and then remeasure until each tire conforms to the guidelines. Such an approach is highly inconvenient and time consuming as compared to the apparatus and method of the present invention wherein the operator can monitor each pair of front and rear tires quickly and efficiently. As mentioned above, the elongated arm of Beckett et al cannot be moved between an extended position and a retracted position to facilitate storage of the apparatus. Thus, the extended arm is always in a condition which will render it susceptible to maladjustment or even damage.

The Italian Patent No. 290,929 to Pietro et al noted above is not suitable for measuring tire pressure, such device being utilized for the measurement of people or animals. The movable height measuring element of Pietro et al is continually spring biased and no provision is made in Pietro et al for locking the height measuring element or indicator in position relative to the rest of the device.

DISCLOSURE OF INVENTION

The present invention encompasses apparatus for engagement with the rim of a parked vehicle wheel having a pneumatic tire disposed about the wheel to visually indicate when the pressure of the pneumatic tire falls below a desired level. The apparatus is of relatively inexpensive construction and may be readily and efficiently utilized to perform the objective of the apparatus.

The apparatus includes an elongated, rigid support having a base positionable on a surface adjacent to a wheel and associated pneumatic tire of a vehicle parked on the surface and extending vertically upwardly from the base.

Arm mounting means is in slidable engagement with the elongated, rigid support and selectively vertically movable between spaced locations on the elongated, rigid support.

Arm means is provided which includes at least one elongated arm having a distal end defining an upwardly disposed wheel rim engagement surface connected to the arm mounting means and movable therewith relative to the elongated, rigid support. The at least one elongated arm is pivotally mounted on the arm mounting means and movable between an extended position wherein the at least one elongated arm extends substantially horizontally from the elongated, rigid support for engagement with the rim of a parked vehicle wheel and a retracted position wherein the at least one elongated arm does not extend substantially horizontally from the elongated, rigid support.

First lock means is provided for releasably locking the at least one elongated arm in the extended position.

Second lock means is provided for releasably locking the arm mounting means against movement relative to the elongated, rigid support at selected locations on the elongated, rigid support.

Other features, advantages, and objects of the present invention will become apparent with reference to the following description and accompanying drawings.

BRIEF DESCRIPTION OF DRAWINGS

FIG. 1 is a perspective view of apparatus constructed in accordance with the teachings of the present invention and showing one arm thereof extended and one retracted;

FIG. 2 is an exploded view showing an arm and related structural elements including a mounting member for the arm;

FIG. 3 is an enlarged cross-sectional view of the support, an arm and related structure;

FIG. 4 is a top plan view of the apparatus;

FIG. 5 is an elevational view of the apparatus adjacent a vehicle wheel and pneumatic tire and in use therewith; and FIG. 6 is a frontal view illustrating the apparatus and a pressure gauge operatively associated therewith.

BEST MODE FOR CARRYING OUT THE INVENTION

Referring now to the drawings, apparatus constructed in accordance with the teachings of the present invention includes an elongated rigid support 10 having a base 12. When the apparatus is in use it is positioned as shown in FIG. 5 on a surface 14 adjacent to a wheel 16 of a vehicle parked on the support surface having a pneumatic tire 18 disposed thereabout. The base 12 is positioned on the surface and the support 10 extends upwardly from the base in a vertical direction.

Slots or notches 20, 22 are formed on opposed sides of support 10 and extend the length thereof. A mounting member 24 is slidably positioned in slot 20 and a mounting member 26 is slidably positioned in slot 22. The mounting members are of identical construction including a curved base plate 28 and a protrusion 30 fixedly attached to the base plate and having a throughbore 32 formed therein. Each base plate 28 defines a threaded aperture 34 which accommodates the threaded end of a lock screw 36.

An arm is operatively associated with each of the mounting members. Arm 40 is operatively associated with mounting member 24 and arm 42 is operatively associated with mounting member 26. The arms are pivotally connected to their respective mounting members and are movable between an extended position in which the elongated arm extends horizontally and a retracted position wherein the elongated arm does not extend horizontally, but rather vertically in the direction of the major axis of support 10. In FIG. 1, for example, elongated arm 40 is in its extended or horizontal position while arm 42 is in its retracted position alongside the support. In FIG. 5, on the other hand, elongated arm 42 is in its extended position and elongated arm 40 is in its retracted position. It will be appreciated that when the arms are in their retracted positions, storage of the apparatus is facilitated and the arms are maintained in positions rendering them less likely to be maladjusted with respect to the rest of the apparatus or damaged.

The arms are attached to protrusions 30 of their respective mounting members by spaced connector elements 44 which have holes formed therein receiving a pivot pin 46 passing through the connector elements and throughbore 32 of protrusion 30 positioned therebetween. The connector elements 44 are preferably tight against protrusion 30 to maintain frictional engagement therebetween which will releasably lock the arms in their extended positions after manual placement of the arms in extended position by the operator or user of the apparatus. It will be appreciated that the ends of the arms adjacent to the support will engage the support when the arms are in their extended positions to stabilize and positively lock the arms horizontally and against further pivotal downward movement.

In operation, one of the arms is to be used in connection with the pair of front wheel/tire combinations of the vehicle while the other is to be used in conjunction with the rear wheels and tires. In the embodiment illustrated, arm 42 is for use with the rear wheels and tires and the arm 40 is for use with the front wheels and tires.

As indicated above, the purpose of the apparatus of the present invention is to visually indicate when the pressure of a pneumatic tire falls below a desired level. The apparatus is, in effect, a particular type of adjustable gauge for readily attaining such objective.

Referring now to FIG. 5, the first step employed when practicing the method of the present invention is to inflate a pneumatic tire, such as tire 18, to a desired pressure level, i.e. the pressure level designated by the manufacturer of the tire or vehicle with which it is associated. Tire 18 is a rear tire but it will be appreciated that the steps to be described are equally appropriate to the front tires.

After tire 18 has been inflated to the desired level, arm 42 is manually positioned in its extended position. Base 12 is positioned on surface 14 and support 10 extends vertically upwardly therefrom adjacent to the wheel 16 and associated tire 18. The distal end of arm 42 is positioned under the lowest point of the wheel rim 50, it being understood that the lock screw 36 is loosened to allow movement of arm 42 and mounting member 26 for such positioning. The lock screw 36 is tightened when the upper or rim engagement surface of the wheel rim engagement member or arm 42 contacts the wheel rim 50 at its lowest point. This fixes the location of the arm 42 relative to the rest of the apparatus. This operation need only be carried out with respect to one of the rear tires as both rear tires are equally inflated. The operation is repeated for arm 40 in connection with the front tires.

After the passage of time, one wishing to determine whether the (rear) tire 18 is still pressurized to the desired extent again places the apparatus (with the arms remaining locked against slidable movement from the positions determined in the prior steps) adjacent to the wheel and pneumatic tire 18, in engagement with the surface, and in a vertical orientation. The arm 42 will, of course, have been moved from its retracted or storage position to its extended position. The operator can readily observe whether or not the tire rim is closer to the surface 14 than the distance between the rim engagement surface of the arm and the surface. If this is indeed the case, the tire 18 is underinflated and will be further pressurized to once again bring it up to the desired pressure level.

It will be appreciated that it is highly advantageous to utilize two arms, one for the rear tires and one for the front tires since this avoids duplication of work by the operator. If desired, indicia such as inch or centimeter markings may be located on the outside of the support as shown.

Support 10 defines an elongated interior 60 which is suitably used to house or accommodate a standard air pressure gauge 62. The air pressure gauge 62, as is conventional, includes a movable indicator 64 for indicating pressure of a tire to which the air pressure gauge is connected. An opening 68 is defined by the support 10 so that the operator can observe the reading of the air pressure gauge indicator when the inlet head thereof is applied to a tire valve stem 70 (FIG. 6). Preferably the air pressure gauge 62 is releasably received by the support 10 so that it may be completely removed therefrom if desired. The support 10 accommodating the air pressure gauge 62 is shown only in FIGS. 5 and 6.

I claim:

1. Apparatus for engagement with the rim of a parked vehicle wheel having a pneumatic tire disposed about the wheel to visually indicate when the pressure of the pneumatic tire falls below a desired level, said apparatus comprising, in combination:

An elongated, rigid support having a base positionable on a surface adjacent to a wheel and associated pneumatic tire of a vehicle parked on said surface, an end spaced from said base, and said elongated, rigid support extending vertically upwardly from said base when the base is positioned on said surface, and said elongated, rigid support defining two elongated spaced slots extending between the base and the end;

arm mounting means in slidable engagement with said elongated, rigid support and selectively vertically movable between spaced locations on said elongated, rigid support;

arm means including at least one elongated arm having a distal end defining an upwardly disposed wheel rim engagement surface connected to said arm mounting means and movable therewith relative to said elongated, rigid support, said at least one elongated arm pivotally mounted on said arm mounting means and movable between an extended position wherein said at least one elongated arm extends substantially horizontally from said elongated, rigid support for engagement with the rim of a parked vehicle wheel and retracted position wherein said at least one elongated arm does not extend substantially horizontally from said elongated, rigid support, said arm means comprising first and second spaced arms, and said arm mounting means comprising first and second mounting members, said first arm pivotally connected to and movable with said first mounting member and said second arm pivotally connected to and movable with said second mounting member, said first and second mounting members being independently vertically movable relative to said elongated, rigid support, said first mounting member being slidably mounted in one of said elongated spaced slots and said second mounting member being slidably mounted in the other of said elongated spaced slots;

first lock means for independently and releasably locking each of said elongated arms in said extended position, and each of said spaced arms having a mounting member abutment surface for abutingly engaging adjoining apparatus structure when in extended position to stabilize the arm; and second lock means for releasably locking said arm mounting means against movement relative to said elongated, rigid support at selected locations on said elongated, rigid support, said second lock means comprising a lock element movably mounted on each of said mounting members for engaging said elongated rigid support and separately and independently locking said mounting members against movement relative to said elongated, rigid support.

2. The apparatus according to claim 1 wherein said elongated, rigid support defines an elongated interior for releasably supporting and accommodating an air pressure gauge, said elongated, rigid support defining a first opening for observing the indicator of said air pressure gauge from a location outside said elongated, rigid support and a second opening spaced from said first opening through which said air pressure gauge projects to facilitate removal of said air pressure gauge from said elongated rigid support.

* * * * *